United States Patent [19]

Lowry et al.

[11] 4,223,787

[45] Sep. 23, 1980

[54] CASSETTE CARRYING CASE

[75] Inventors: Alan B. Lowry, Canton, Mass.; David E. Roche, Nashua, N.H.; Gregory Mathus, Concord, Mass.

[73] Assignee: Data Packaging Corporation, Cambridge, Mass.

[21] Appl. No.: 37,488

[22] Filed: May 9, 1979

[51] Int. Cl.³ .................. G11B 23/02; G11B 1/00; E05C 1/10; B65D 85/672
[52] U.S. Cl. .................. 206/387; 206/1.5; 220/334; 220/343; 292/163; 292/175; 292/DIG. 38
[58] Field of Search ............... 206/387, 1.5; 220/343, 220/334; 292/175, 163, 87, DIG. 38

[56] References Cited

U.S. PATENT DOCUMENTS

| 3,046,043 | 7/1962 | Matteson | 292/175 |
| 3,171,700 | 3/1965 | Parsell et al. | 206/541 |
| 3,464,240 | 9/1969 | Brody et al. | 292/163 |

FOREIGN PATENT DOCUMENTS 2610832  9/1977  Fed. Rep. of Germany ........... 206/387

Primary Examiner—William T. Dixson, Jr.
Attorney, Agent, or Firm—Wolf, Greenfield & Sacks

[57] ABSTRACT

A cassette-carrying case having a base and cover joined by a piano hinge which allows the base and cover to be opened a full 180°. Easily operable latches are incorporated into the cover, which automatically lock the case closed when the cover is moved to the closed position. A handle is incorporated into the main body of the base and cover.

8 Claims, 5 Drawing Figures

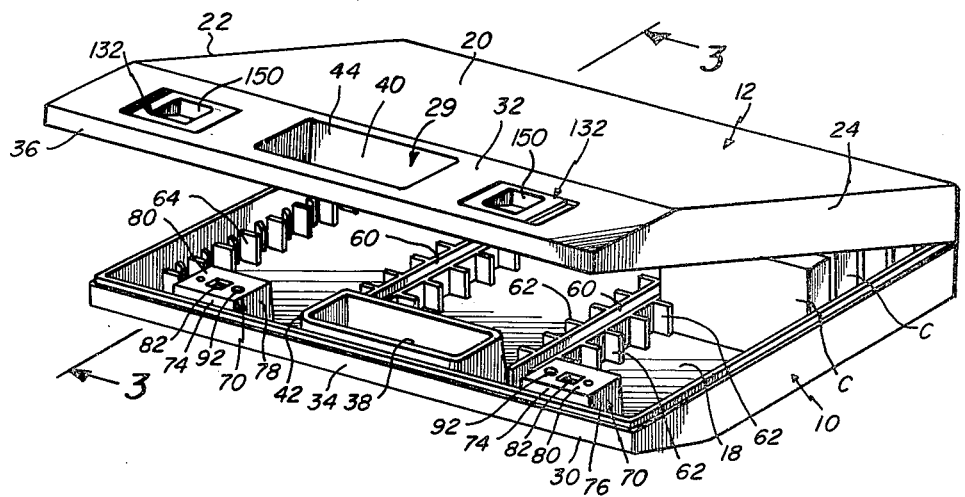
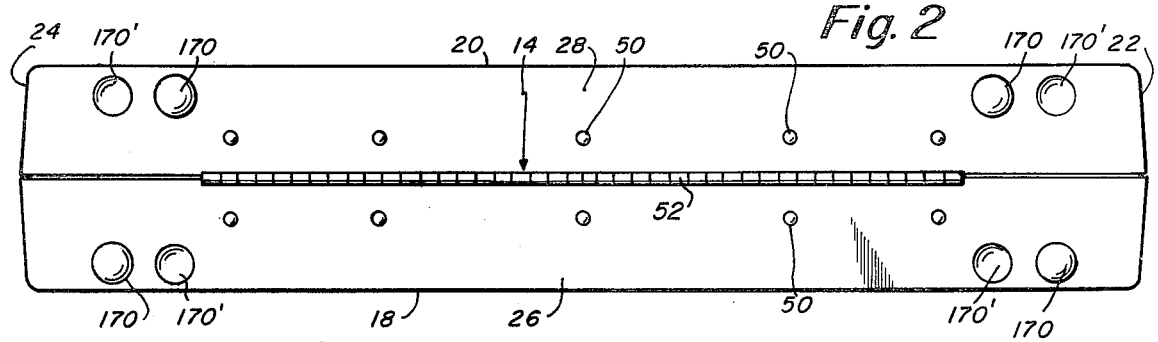
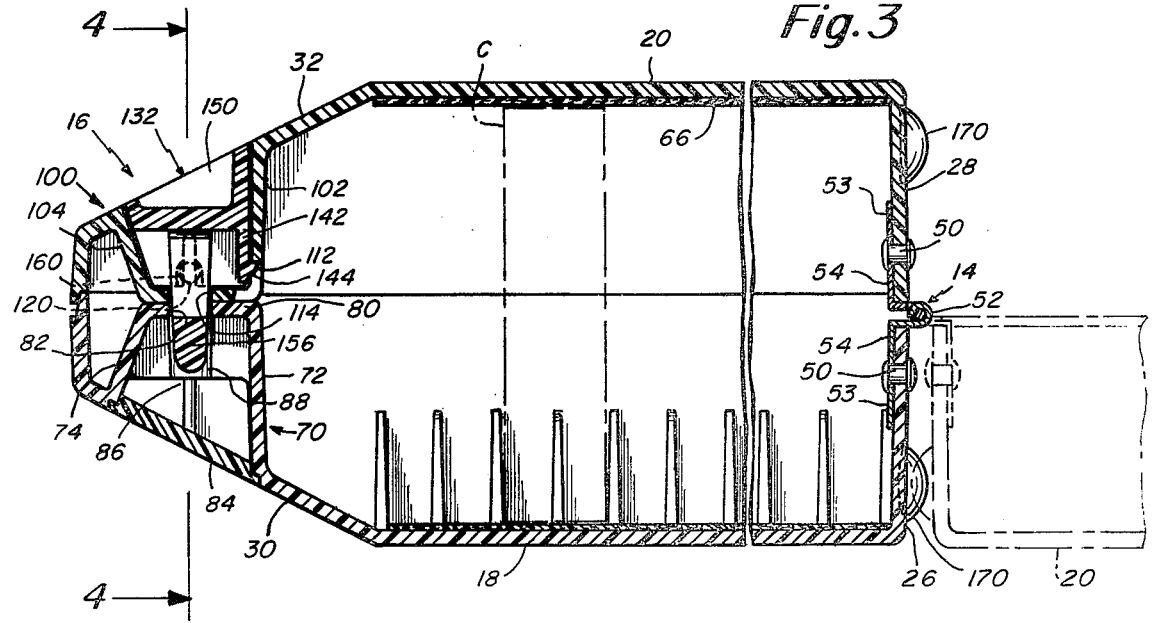

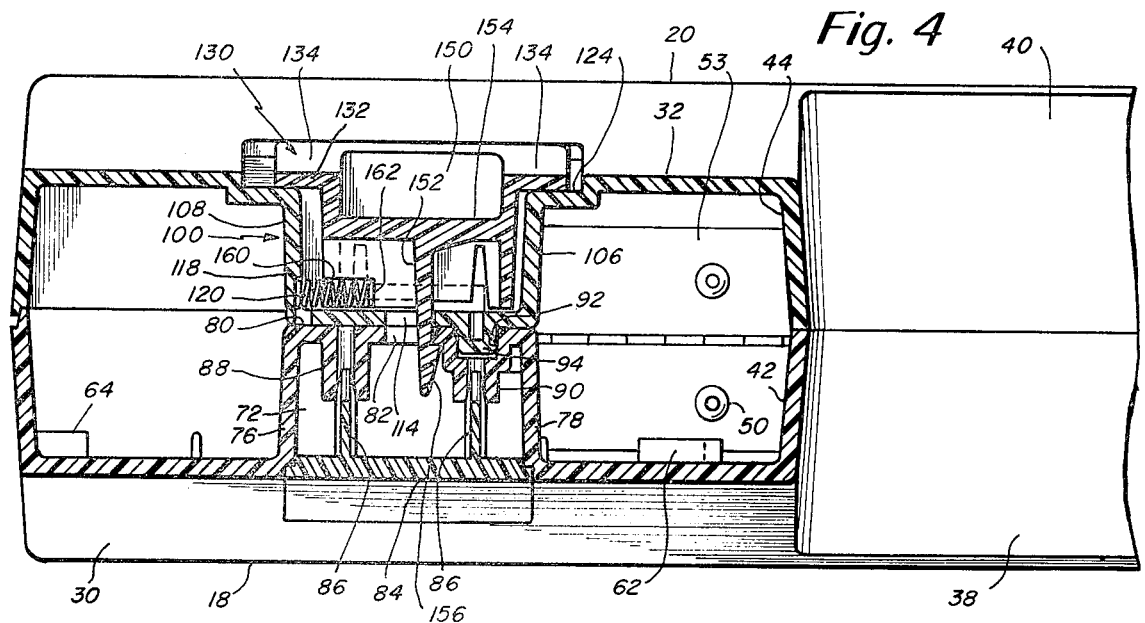
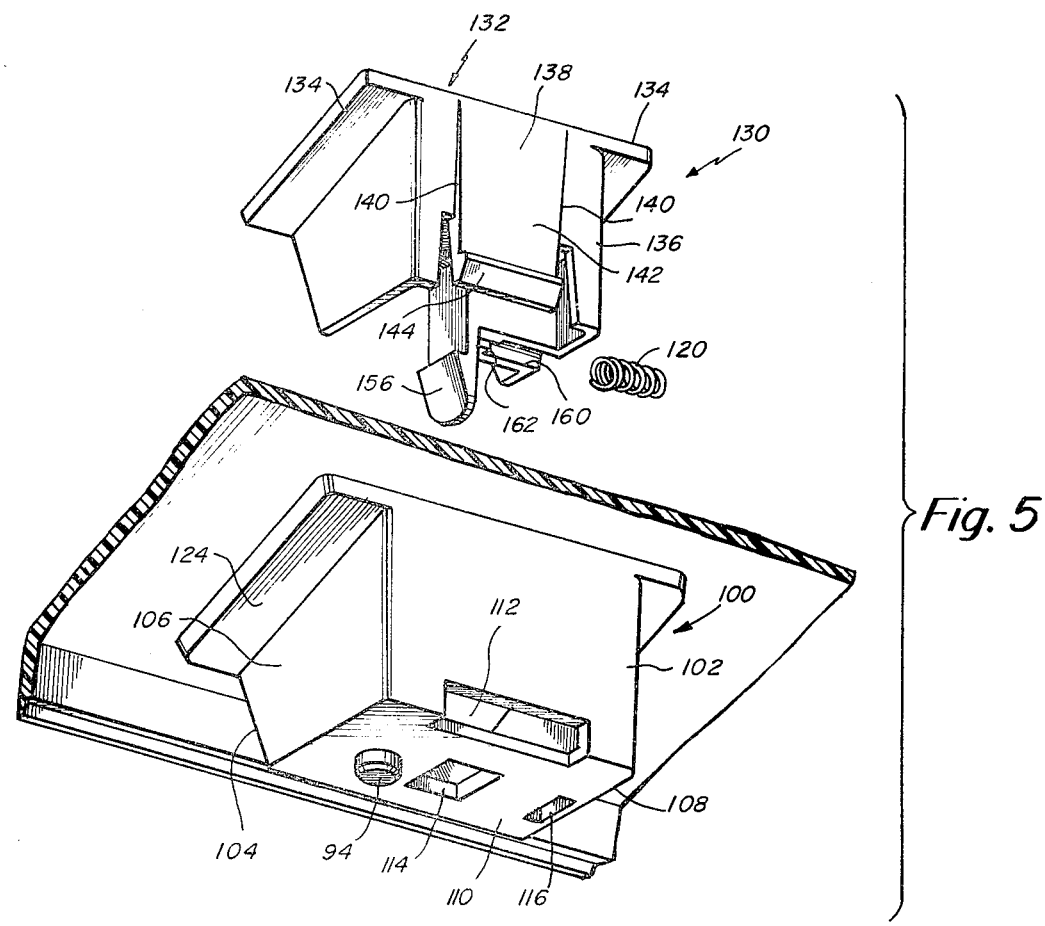

4,223,787

CASSETTE CARRYING CASE

INTRODUCTION

This invention relates to cassette carrying cases and more particularly comprises a relatively inexpensive, well designed case for cassettes which provides maximum protection for the contents and maximum convenience for the user.

There are a variety of cassette carrying cases on the market, and most are quite expensive. The case of the present invention is designed for maximum convenience to the user by providing the following features:

(1) The case automatically latches closed when the cover is moved to the closed position;

(2) The case may be opened a full 180°, so as to lie flat on any supporting surface;

(3) The handle is incorporated into the case proper so that it does not interfere with the opening and closing of the case, and furthermore the handle provides an additional assurance against accidental opening of the case when the handle is grasped by the user;

(4) Latching devices are provided on the cover, which are in full view and readily accessible;

(5) The carrying case is also inexpensive to manufacture because it is composed of a minimum number of parts, and the parts may be quickly assembled, to make the case relatively inexpensive.

These and other features of this invention will be better understood and appreciated from the following detailed description read in connection with the accompanying drawing.

BRIEF FIGURE DESCRIPTION

FIG. 1 is a perspective view of the cassette carrying case of this invention and shown with the cover partly opened;

FIG. 2 is a rear view of the carrying case;

FIG. 3 is a fragmentary cross-sectional view of the carrying case taken along the section line 3—3 of FIG. 1 and showing the case closed in full lines and suggesting the case fully opened in broken lines;

FIG. 4 is a fragmentary cross-sectional view of one of the latches of the carrying case, taken along the section line 4—4 of FIG. 3; and FIG. 5 is an exploded perspective view of the portion of the latch assembly carried in the cover, viewed from the rear of the case.

DETAILED DESCRIPTION OF THE DRAWINGS

The cassette carrying case shown in the drawing includes a base 10 and a cover 12 secured together by a piano hinge 14. The base and cover are releasably secured in the closed position by a pair of latches 16 provided at the front of the case.

Base 10 and cover 12 together define a shell comprising the bottom and top walls 18 and 20 of the case, as well as side walls 22 and 24 and rear walls 26 and 28. A handle 29 is incorporated into the body of the case directly in panels 30 and 32. Panels 30 and 32 in the base and cover respectively converge toward one another in the direction of the front of the case as viewed in FIG. 1. Rather short front walls 34 and 36 extend toward one another from the front edges of the respective panels to complete the main shell structures of the base and cover. The base and cover may inexpensively and effectively be injection molded from a high impart styrene or other similar material capable of withstanding the normal abuses to which cases of this type are normally subjected.

Openings provided in the central portion of panels 30 and 32 as shown at 38 and 40 in FIG. 1 define the handle 29 of the case. Walls 42 and 44 while also defining the handle extend toward one another from the panels 30 and 32 immediately surrounding the openings 38 and 40, so that when the case is closed a tubular opening of generally rectangular shape is furnished at the front end of the case large enough to receive the hand of the carrier so as to provide a convenient handle grip for carrying the case about.

The piano hinge 14 is shown in FIGS. 2 and 3 to be riveted to the rear walls 26 and 28 of the base and cover, respectively, by the rivets 50. The hinge cylinder 52 lies outside the case while the hinge plates 53 are disposed inside the case. The configuration of the piano hinge is such that the case may be fully opened so that the bottom and top walls 18 and 20 of the base end cover, respectively, lie in a common plane as suggested by broken lines in FIG. 3. This affords maximum convenient access to the inside of the case and allows it to be placed on a table, car seat or any other surface.

The base 10 is shown in FIG. 1 to carry a pair of upwardly extending partitions 60, each of which carries a plurality of dividers 62 that are spaced apart a distance substantially equal to the width of the boxed cassettes suggested at C in FIG. 1. Additional dividers 64 are provided on the inner surfaces of each of the side walls 22 and 24 of the base (only one side can be seen in FIG. 1), aligned with the dividers 62 on the partitions 60 so as to be in a position to firmly engage the boxed cassettes stacked in parallel on the base. It is evident that such an arrangement will accommodate a maximum number of boxed cassettes in the area provided. The dividers are only of sufficient thickness so as to enable one cassette to be withdrawn from the case without disturbing the others stored in the case. A felt pad 66 preferably is secured to the inner surface of the top wall 20 of the cover, which pad bears against the edges of the cassette boxes as suggested in FIG. 3 when the case is closed so as to prevent the cassettes from rattling or moving about in the case.

The latches 16 provided in the front portion of the case includes a pair of generally rectangular wells 70 molded as an integral part of the base 10 in the panel 30. The wells 70 extend upwardly from the panel 30, and each well has a substantially vertical rear wall 72, upwardly inclined front wall 74 and side walls 76 and 78. The tops of the wells are closed by walls 80 having a central rectangular opening 82. The bottom of each well is closed by an imperforate plate 84 which may be ultrasonically welded or otherwise secured in place as shown in FIGS. 3 and 4. For that purpose, each plate 84 carries a pair of pins 86 formed as integral parts of the plate that fit into sleeves 88 and 90, respectively, molded on the bottom surface of wall 80, on each side of the opening 82. It will also be noted particularly in FIG. 4 that the opening in sleeve 90 is enlarged at its upper end as shown at 92. The enlarged opening 92 receives a boss 94 formed in the well of the cover described below so as to align the cover and base properly with respect to one another when the case is closed so that the edges of the peripheral walls mate properly as shown in FIGS. 1 and 4.

A pair of wells 100 are formed in the cover, which are substantially identical in shape to the wells 70 formed in the base. Moreover, the wells 100 are aligned with the wells 70 so that when the case is closed, the opposed end walls of the wells engage one another. Each well 100 includes a substantially vertical rear wall 102, inclined front wall 104 and side walls 106 and 108. The wells 100 are closed by bottom wall 110. A slot 112 is formed at the intersection of bottom wall 110 and rear wall 102, and an opening 114 is provided centrally of the bottom wall in alignment with the opening 82 in the top or end wall 80 of the well 70. Yet another opening 116 is provided in bottom wall 110 to facilitate the formation of a shoulder or undercut 118 in the side wall 108, which shoulder serves to retain a compression spring 120 in place when the latch is assembled. In FIG. 4 it will be noted that a shallow seat 124 is provided in the panel 32 beyond the side walls 106 and 108 of well 100 to support the slide 130 of the latch. The slide 130 as shown in FIG. 5 includes a top wall 132 whose ends 134 sit in the shallow seat 124 in the panel 32. The width of the top wall is less than the width of the seat so that the slide may move from side to side in the well as explained in greater detail below. Rear wall 136 depends from the top wall 132 of the slide and lies against the rear wall 102 of the well 100. The central portion 138 of the wall 136 is separated by slits 140 from the rest of the rear wall 136 to form a tongue 142 having a hook-like undercut 144 at its lower end which is designed to engage the slot 112 at the base of rear wall 102 of well 100 so as to retain the slide 130 in the well. It is evident that the tongue 142 will hold the slide in the well but not interfere with the lateral motion of the slide because the tongue 144 is narrower than the slot 112.

A shallow recess 150 is formed in the top wall 132 of each slide to assist in actuation of the slides, and a flexible finger 152 depends from the bottom 154 of the recess, which finger has a hook-like barb 156 or undercut at its lower end that extends through the opening 114 in the well 100 of the cover. When the case is closed, the finger 152 also extends through the opening 82 in the top wall 80 of the well in the base, and when the slide is positioned as shown in FIG. 4, the barb 156 latches onto the margin of the opening 82 in well 70 in the base to retain the case in the locked position. The slide is biased to the locking position shown in FIG. 4 by spring 120 seated in the cavity 160 formed in the slide. The spring 120 bears against the end 162 of the cavity and the wall 108 of the well beneath shoulder 118 when the slide is assembled in the well so as to bias the slide to that position. However, the slide may very easily be moved to the left as viewed in FIG. 4 against the bias of spring 120 to unhook the barb 156 from the edge of the opening 82 so as to enable the case to be opened. It is apparent that to open the case, it is necessary to move both slides 130 outwardly (toward their respective sides of the case) so as to cause the barbs on the fingers to release the margins of the openings 82 in the top walls of the wells 70. On the other hand, when the case is to be closed and latched, the user need only move the cover 12 to the closed position. The tapered surfaces of the barbs 156 will slide on the margins of the openings 82 while the bosses 94 fit into the openings 92 in the sleeves of the lower wells. The undercut of the barbs 152 ultimately will pass beneath the margins of the openings 82 to affect a secure lock for the case.

From the foregoing description it will be appreciated that the cassette carrying case of this invention may be manufactured quite inexpensively. The base and cover along with the latching slides and plates 84 may all be injection molded. Preferably a high quality piano hinge made of metal is used so as to provide a dependable and long lasting hinge for the case. The case may stand erect on its rear wall, as feet 170 are provided on the outer surface of the end walls. The feet 170 are longer than the diameter of the barrel portion of the panel hinge 14. Consequently, the case may stand on its rear wall without interference from the hinge and without the hinge marring the surface. The feet do not interfere with the full opening of the case because the feet on the cover and base are offset with respect to one another and opposed recesses 170' are also provided as shown in FIG. 2. The case has a very substantial capacity; for example, it may conveniently be sized to accommodate 24 boxed cassettes in three rows of eight, and the cassettes are securely held in place in the case when the case is closed so that they will not rattle in the case or be jarred if the case is banged. Latches 16 allow the case to be conveniently opened with the case in the horizontal position of FIG. 1 as the latches are fully exposed on the upper surface of the cover. And the latches are such that the case automatically snaps shut when the cover is closed so that the case will not accidentally open or fail to latch and spill out its contents. And in manufacture, the latch slides 130 may very conveniently be mounted in the wells of the cover and are retained by the tongues 142.

Because numerous modifications have been made of this invention without departing from its spirit, it is not intended to limit the invention to the single embodiment illustrated and described. Rather, it is intended that the scope of the invention be determined by the appended claims and their equivalents.

What is claimed is:

1. A cassette carrying case comprising a base and a cover,
   said base having a flat bottom wall, side walls extending upwardly from the side edges of the bottom wall, and a rear wall extending upwardly from the rear edge of the bottom wall and connected to the rear ends of the side walls,
   said cover having a flat top wall, side walls extending downwardly from the side edges of the top wall, and a rear wall extending downwardly from the rear edge of the top wall and connected to the rear ends of the side walls,
   a handle portion formed as an integral part of the base and cover,
   said handle portion having converging panels forming continuations of the bottom wall of the base and the top wall of the cover with the panels converging toward one another in a direction away from rear wall and toward the front of the case, front walls secured to the front edges of the panels and the front ends of the side walls of the cover and base, and aligned openings formed in both panels of the handle portion defining a finger grip opening for carrying the case,
   a hinge secured to the rear walls of the cover and base enabling the cover and base to pivot 180° with respect to one another between a closed position wherein the front, side and rear walls engage one another and an open position wherein the top and bottom walls are substantiallly coplanar,
   dividers mounted in the base defining a plurality of compartments for holding the cassettes, and latching means provided in the handle portion of the cover and base to lock the case closed, said latching means comprising at least one generally rectangular well formed in the panel of the cover, a slide mounted in the well and movable between latching and unlatching positions, a barb formed as an integral part of the slide and an opening in the well for receiving the barb to retain the slide in the well, a finger integral with the slide, and means defining a slot formed in the panel of the base, said finger engaging the margin of the slot when the slide is in the latching position to lock the case closed and releasing the margin when the slide is in the unlatching position.

2. A cassette carrying case as defined in claim 1 further characterized by said means defining a slot including a well formed in the panel of the base and aligned with the well in the panel of the cover, a bottom wall in the well of the base and said slot being formed in said bottom wall.

3. A cassette carrying case as defined in claim 1 further characterized by said hinge being a piano hinge joining the rear walls of the base and cover.

4. A cassette carrying case as defined in claim 2 further characterized by said latching means comprising two separate identical mechanisms each including wells in the cover and base, slides in the wells in the cover, fingers on the slides and slots in the bottom wall of the wells in the base.

5. A carrying case for cassettes and the like comprising a base and a cover hinged together along one side thereof;

and latching means formed at the opposite side of the base and cover to releasably lock the base and cover closed, said latching means including wells formed in the cover and base and aligned with one another when the case is closed and each well having a bottom wall lying in close proximity and parallel to each other when the case is closed, a slide in one of the wells and carrying a finger extending through the bottom wall of that well, an opening in the bottom wall of the other wall through which the finger extends when the case is closed, a barb on the finger biased to a position to engage the margin of the opening to retain the case in the closed position, said slide being movable against the bias to cause the bar to release the margin to permit the case to be opened, and snap means carried on one of the slide and the well which contains it for locking the slide in that well while enabling the slide to move in the well.

6. A carrying case as defined in claim 5 further characterized by means in the bottom walls of each well separate from the finger and opening engaging one another when the case is closed to align the base and cover.

7. A carrying case as defined in claim 5 further characterized by said snap means including a tongue formed as an integral part of the slide and a slot provided in the bottom wall of said other well for receiving the tongue.

8. A carrying case as defined in claim 5 further characterized by a spring in the well containing the slide and urging the slide to a position wherein the finger engages the opening to retain the case closed.

* * * * *